United States Patent [19]

Mello

[11] 4,236,654

[45] Dec. 2, 1980

[54] APPARATUS FOR BLOWING INSULATING MATERIAL INTO AN ATTIC, WALL CAVITY OR WET SPRAYING AGAINST A SURFACE

[75] Inventor: Frank A. Mello, Richmond, Calif.

[73] Assignee: Mello Manufacturing, Inc., Richmond, Calif.

[21] Appl. No.: 849,320

[22] Filed: Nov. 7, 1977

[51] Int. Cl.$^3$ .............................................. B65G 53/40

[52] U.S. Cl. .................................... 222/238; 222/630; 427/196; 406/65

[58] Field of Search ............... 222/194, 226, 236, 238, 222/239, 240; 302/49; 241/95, 101 A; 427/196

[56] References Cited

U.S. PATENT DOCUMENTS

| | | | |
|---|---|---|---|
| 1,931,670 | 10/1933 | Miller | 222/240 |
| 1,978,125 | 10/1934 | Bennett | 427/196 |
| 2,183,583 | 12/1939 | Patterson | 241/101 A |
| 3,136,454 | 6/1964 | Kempton | 222/238 X |
| 3,187,958 | 6/1965 | Swart | 222/238 X |
| 3,529,870 | 9/1970 | Woten | 302/49 |
| 4,083,475 | 4/1978 | Venner et al. | 222/238 X |

*Primary Examiner*—Joseph J. Rolla

*Attorney, Agent, or Firm*—Alvin E. Hendricson; William R. Piper

[57] ABSTRACT

A portable apparatus for blowing a chemically treated cellulose insulating material into an attic, wall cavity or wet spraying the material against a surface for insulating it. The apparatus breaks the cellulose material into small particles and, after fluffing the material, the apparatus meters and feeds the material under pressure through a hose and out through a nozzle where an operator can point the nozzle for directing the material to any desired area. Three different nozzles are used: one for attic insulation; a second for filling wall cavities; and a third for wet spraying the material against a surface for causing the material to adhere to the surface.

2 Claims, 14 Drawing Figures

APPARATUS FOR BLOWING INSULATING MATERIAL INTO AN ATTIC, WALL CAVITY OR WET SPRAYING AGAINST A SURFACE

RELATED APPLICATION

This application is a corrected copy of applicant's abandoned application on the same invention, filed Sept. 7, 1976, Ser. No. 720,967.

SUMMARY OF THE INVENTION

An object of my invention is to provide a portable apparatus that can perform all three types of insulation and these are: loose fill insulation for attics; filling wall cavities with insulating material; and the wet spray application of the insulating material to a wall surface. The nozzle used for insulating attics has a switch that the operator can actuate for disconnecting the operating mechanism from the engine and for simultaneously shutting off the air. This permits the operator to immediately move the hose and nozzle to another location without having to wait for the hose to empty itself of the insulating material.

A further object of my invention is to provide an improved auger for aiding in fluffing the material as well as for delivering it smoothly and without lumps to the nozzle. The use of the wet spray nozzle permits a liquid adhesive to be mixed with the insulating material in the nozzle just prior to spraying the material against a surface. A pure white insulating material can be used and this makes decorative spraying possible which may be used in cocktail lounges, restaurants, home ceilings, etc. The white material could be colored by the introduction of a dye during the applying of the liquid adhesive to the material.

DESCRIPTION OF THE PREFERRED EMBODIMENTS

Figure 1:
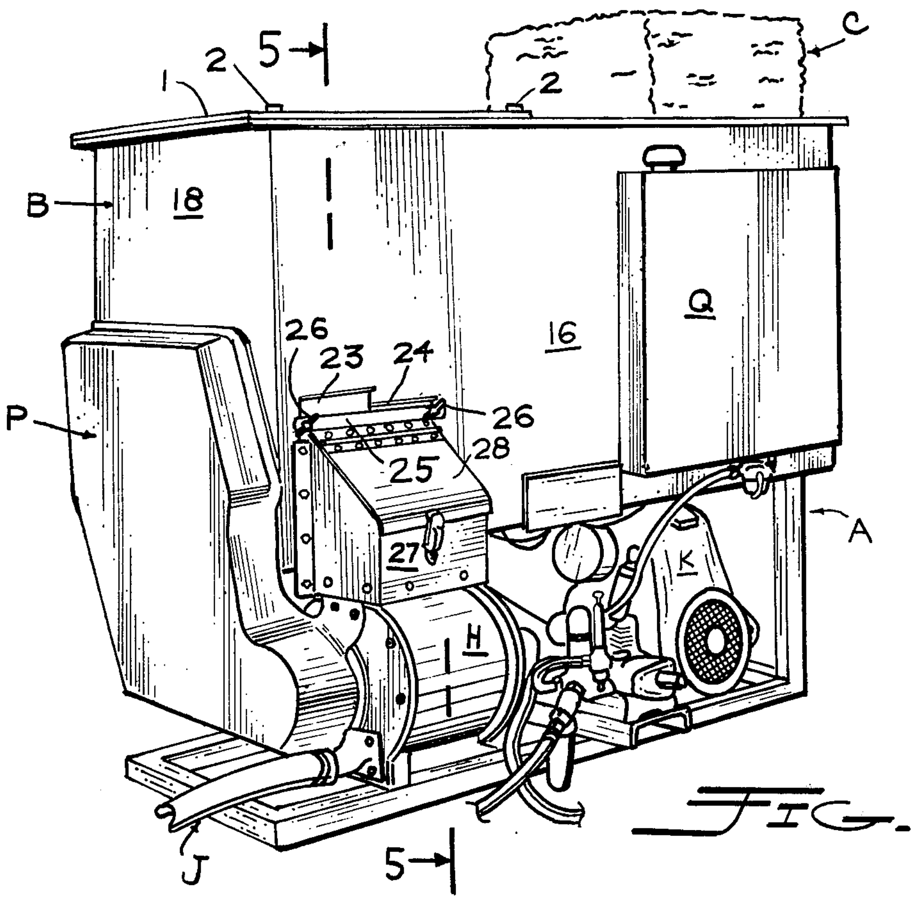
FIG. 1 is a perspective view of the entire apparatus.
Figure 2:
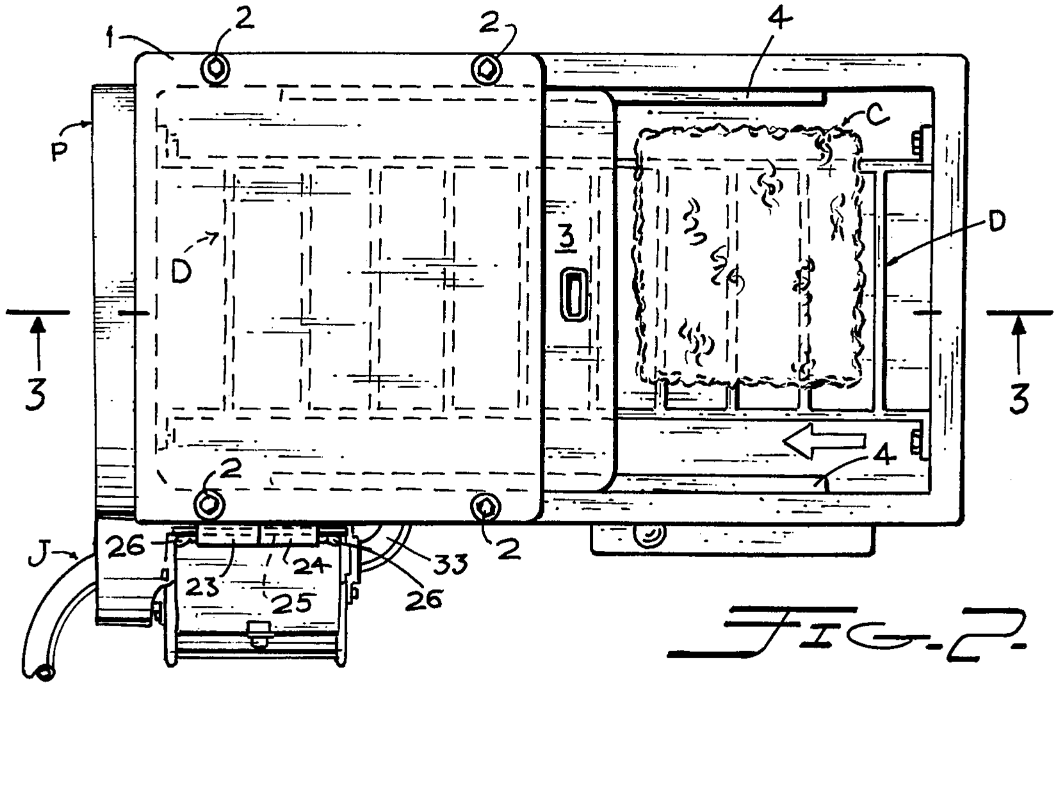
FIG. 2 is a top plan view of the hopper that receives the insulating material.
Figure 3:
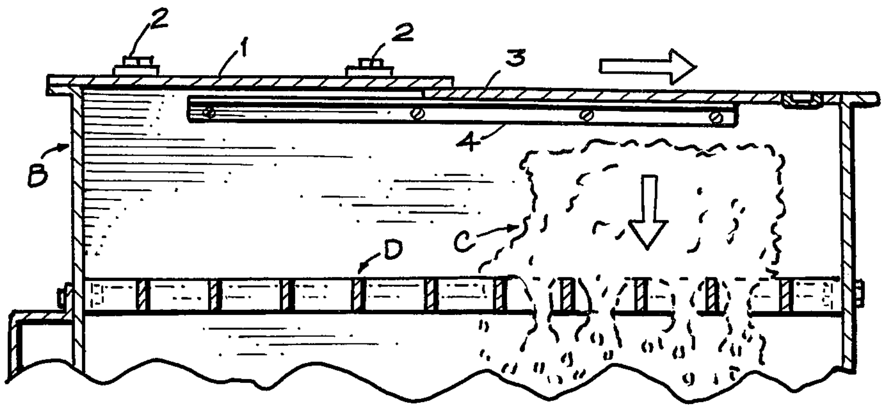
FIG. 3 is a vertical longitudinal section through the upper portion of the hopper and is taken along the line 3—3 of FIG. 2.

In carrying out my invention I provide a portable frame A which supports a hopper, indicated generally at B, see FIG. 1. A top plan view of the hopper is illustrated in FIG. 2 and a vertical longitudinal section is shown in FIG. 3. The hopper top is preferably rectangular in shape and substantially one-half of the top is closed by a cover 1 that is held in place by bolts 2 or other fastening means. A slidable cover 3 normally closes the other open half of the hopper top and it is slidably supported by guides 4 which permit the movable cover to slide under the stationary cover 1 when the hopper is to receive a bale of the chemically treated cellulose insulating material C, see FIGS. 1, 2 and 3. FIG. 1 shows the bale C being fed into the hopper B, and FIG. 2 shows the movable cover 3 opened a sufficient distance to permit the entrance of the bale into the hopper. FIG. 3 shows the bale C received within the hopper and the movable cover 3 in substantially closed position.

I mount a safety grill D, within the hopper B, and space it below the top of the hopper and position it so that it will lie in a horizontal plane, see FIGS. 2 and 3. The grill extends over substantially the entire area of the hopper and its purpose is to break up the bale of material C, into smaller particles and to prevent an operator's hand from reaching below the grill and being injured by the operating parts in the lower portion of the hopper, see FIG. 5. These operating parts in the hopper will now be described.

Figures 5, 6, 7:
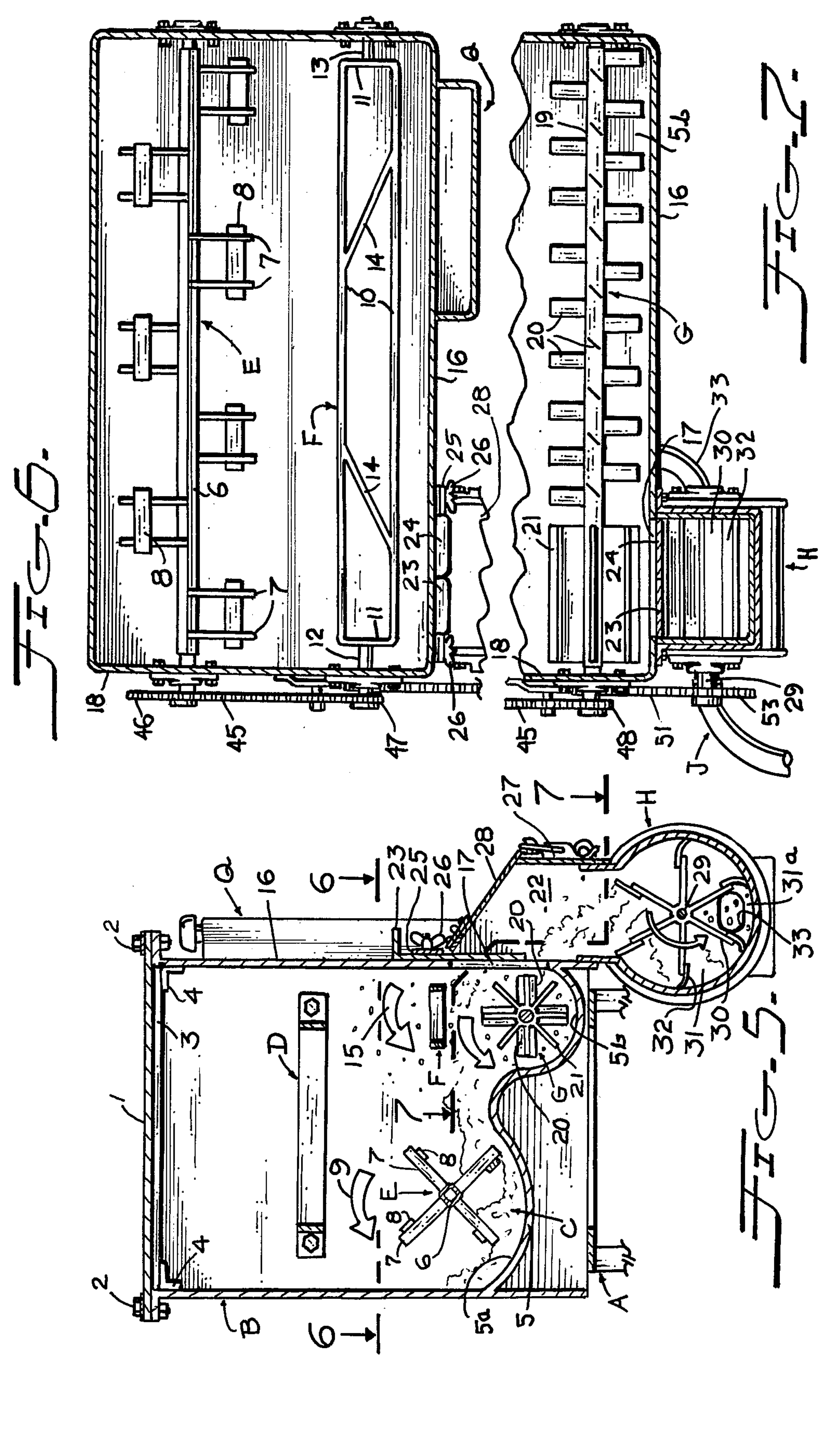
FIG. 5 is a vertical transverse section through the hopper and is taken along the line 5—5 of FIG. 1 to illustrate the internal mechanisms in the hopper and the adjacent metering device.
FIG. 6 is a horizontal section through the hopper and is taken along the line 6—6 of FIG. 5 to show the beater and the fluffer.
FIG. 7 is another horizontal section through a portion of the hopper to illustrate the auger and the metering device for the material and it is taken along the line 7—7 of FIG. 5.

The bottom wall 5 of the hopper B, is undulating in transverse cross section as is clearly shown in FIG. 5. The concave portion 5*a* of the bottom wall 5 has a curvature whose center coincides with the axis of a beater and feeder E that is rotatably mounted in the hopper and positioned below the grill D, and near the left hand hopper wall when looking at FIG. 5. A top plan view of the beater/feeder for breaking up the insulating material into smaller particles is shown in FIG. 6. The feeder/beater has a shaft 6 whose ends are journalled in the end walls of the hopper B, and four rows of spaced apart pairs of arms 7 extend radially from the shaft, each row being angularly spaced from adjacent rows by an angle of 90° as is clearly shown in FIGS. 5 and 6. Longitudinally extending paddles 8 extend between and are connected to each pair of arms 7 and are spaced from the shaft 6 and parallel its axis. The function of the beater/feeder is not only to break up the insulating material C, into smaller particles, but to also fluff the material and to move it transversely along the concave surface *5a* of the bottom hopper wall 5 and up and over the longitudinally extending hump lying between the concave surface *5a* and a second concave surface *5b*. The transverse movement of the material is toward the right hand wall of the hopper when looking at FIG. 5. The arrow 9 indicates the counterclockwise rotation of the beater/feeder in this Figure and I will describe the driving means for it hereinafter.

Still referring to FIGS. 5 and 6, it will be seen that I rotatably mount a fluffer F, in the hopper B. This fluffer for the insulating material is in the shape of a rectangular frame with the two parallel side bars 10 spaced apart and having a length substantially coextensive with that of the hopper B, and its two ends 11 are positioned near to the hopper end walls. Aligned stub shafts 12 and 13 project beyond the end members 11 of the fluffer F, and they are journalled in the hopper end walls as clearly shown in FIG. 6. Diagonal bracing members 14 extend between the side bars 10. The fluffer is rotated in a counterclockwise direction as shown by the arrow 15 in FIG. 5 and the mechanism for doing this will be described later. The fluffer F, is positioned near the right hand hopper wall 16 when looking at FIG. 5 and just above an opening 17 in the wall.

FIG. 7 shows a horizontal section taken along the line 7—7 of FIG. 5 and shows the opening 17 in the hopper wall 16 as being disposed adjacent to an end wall 18 of the hopper B. An auger G of special design is positioned in the hopper adjacent to the side wall 16, see also FIG. 5, and just above a second concave portion *5b* in the bottom wall of the hopper. The auger has a shaft 19, square in cross section and the ends of the shaft are journalled in the end walls of the hopper. The purpose of the auger is to receive the insulating material C from the beater/feeder E and from the fluffer F and feed this material along the trough-shaped concave portion *5b* of the hopper bottom 5 to the outlet opening 17 and then to force the material through the opening. In order to accomplish this the portion of the auger shaft 19 not disposed adjacent to the hopper exit opening 17 is provided with radially extending blades that are arranged in the form of a helix around the shaft.

Figure 8:
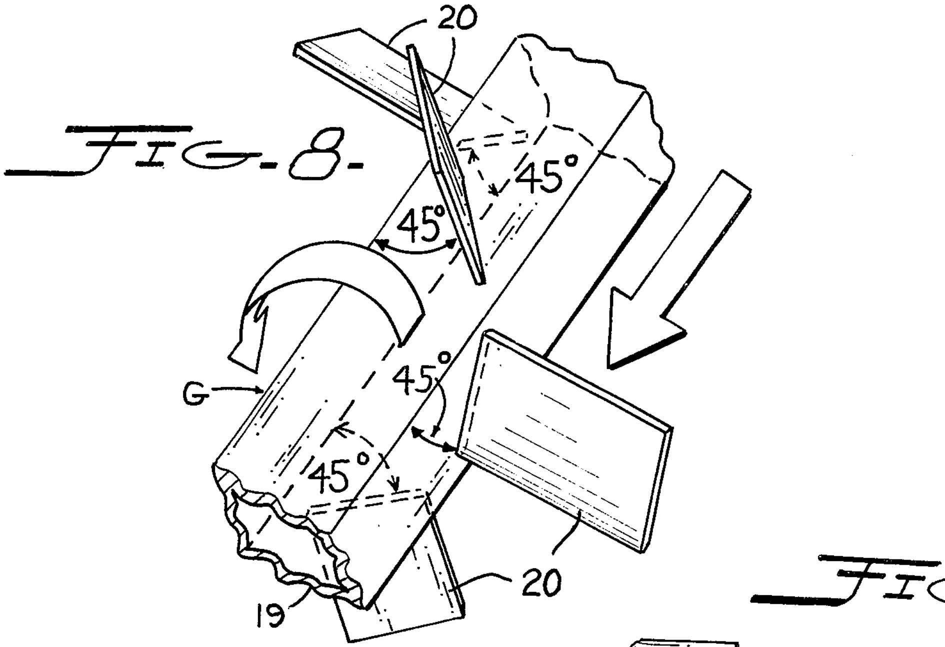
FIG. 8 is an enlarged isometric view of a portion of the auger to show how the blades extend radially from the sides of the auger shaft that is square in cross section, the blades making a forty five degree angle with respect to the longitudinal edges of the sides from which the blades project and the successive blades being arranged in the form of a helix along the shaft.
Figure 9:
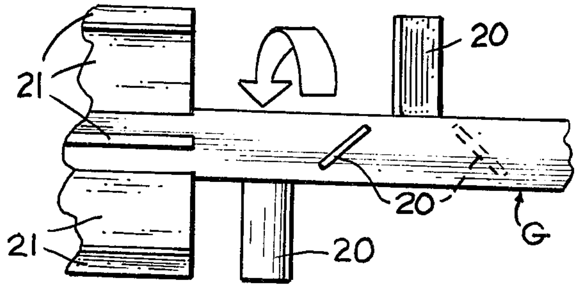
FIG. 9 is a side elevation of one end of the auger to illustrate the portion of the auger that has the longitudinally and radially extending blades used for feeding the insulating material to the metering device.

An enlarged isometric view of the auger shaft 19 is shown in FIG. 8. The blades 20 extend radially from each one of the four sides of the square auger shaft and are arranged in the form of a helix. Also each blade is flat and forms an angle of 45° with respect to the longitudinal edges of the shaft. The curved arrow in FIGS. 5 and 8, shows the counterclockwise direction of the auger G, and the angle of the blades 20 is such that the insulating material will be fluffed and moved along the trough *5b*, in the hopper bottom wall 5 and toward the exit opening 17 in the hopper side wall 16.

It will be noted from FIG. 7, that the helically arranged blades 20 along the shaft 19 of the auger G, extend from the right hand end of the shaft and stop at a point adjacent to the right hand edge of the exit opening 17 in the hopper wall 16. The portion of the square shaft 19, which parallels and lies opposite to the exit opening 17, has a plurality of radially extending and longitudinally arranged paddles 21 for moving the insulating material transversely to the length of the trough *5b*, and propelling the material, while still in a fluffy condition, through the exit opening 17 and into a passage 22, clearly shown in FIG. 5.

A pair of vertically adjustable gates 23 and 24, see FIGS. 1, 2 and 4 to 7, inclusive, control the size of the exit opening 17 in the hopper wall 16. A horizontal strap 25 frictionally bears against the gates to hold them in adjusted position and bolts with wing nuts 26 secure the strap to the hopper side wall 16 and apply the desired frictional pressure against the two gates. The passage 22 for receiving the fluffed insulating material C from the exit opening 17 in the hopper wall 16, is formed within a housing 27 whose open upper end is normally closed by a cover 28, see FIG. 5. The cover 28 may be opened for inspecting the effective size of the exit opening 17 resulting from the vertical adjustment of the two gates 22 and 23. The lengths of the longitudinally extending paddles 21 are equal to the length of the opening 17.

FIG. 5 shows the lower end of the housing 27 opening into a metering device and valve for the insulating material C, and indicated generally at H. The casing for the metering device is cylindrical and an axial shaft 29 has its ends rotatably mounted in the end walls of the casing as shown in FIG. 7. Blades 30 extend radially from the shaft 29 and are spaced equidistances apart so that the capacities between each pair of blades and indicated at 31 are identical. In this way the insulating material fed into the metering device through the passage 22 will be divided into successive equal amounts by the rotating blades and fed into an outlet hose J, see FIG. 4. Again referring to FIG. 5, it will be seen that the outer end of each metering blade 30 carries a flexible lip 32 that rubs against the inner cylindrical surface of the casing for the metering device H.

When a pair of blades 30 of the metering device H, reach a position where the capacity defined by the blades is at the lower part of the meter casing, as shown at **31*a* in FIG. 5, the insulating material in the capacity 31*a* will be in communication with the inlet to the hose J. If now air under pressure is delivered into the capacity 31*a* through a hose 33, in a manner hereinafter described, the material in the capacity 31*a* will be forced through the outlet hose J. The flexible lips 32 prevent any air entering the lower capacity 31*a* from bleeding past the lips and entering the passage 22. In this way the metering device H performs the additional function of acting as a valve and causing all of the air from the hose 33 that enters the capacity 31*a*** to enter the outlet hose J, and carry the material with it.

Figure 10:
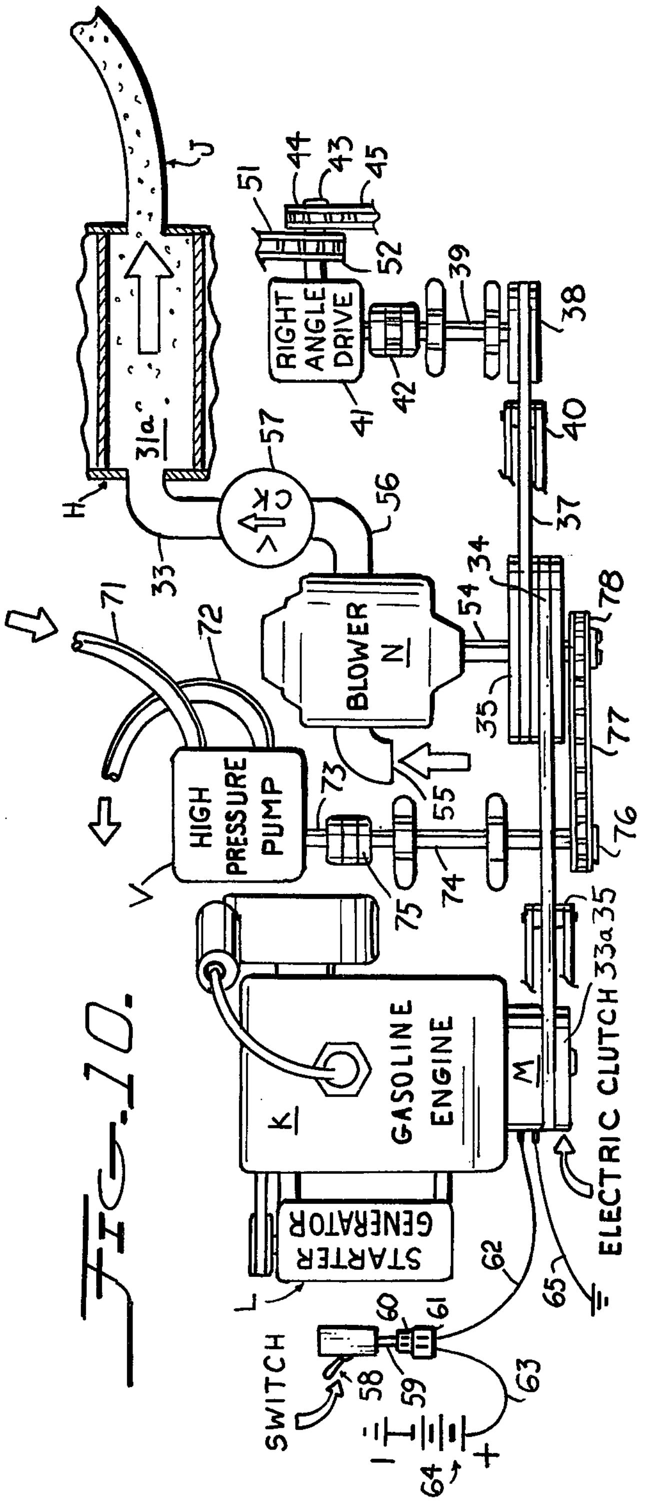
FIG. 10 is a schematic showing of the entire driving mechanism.
Figure 11:
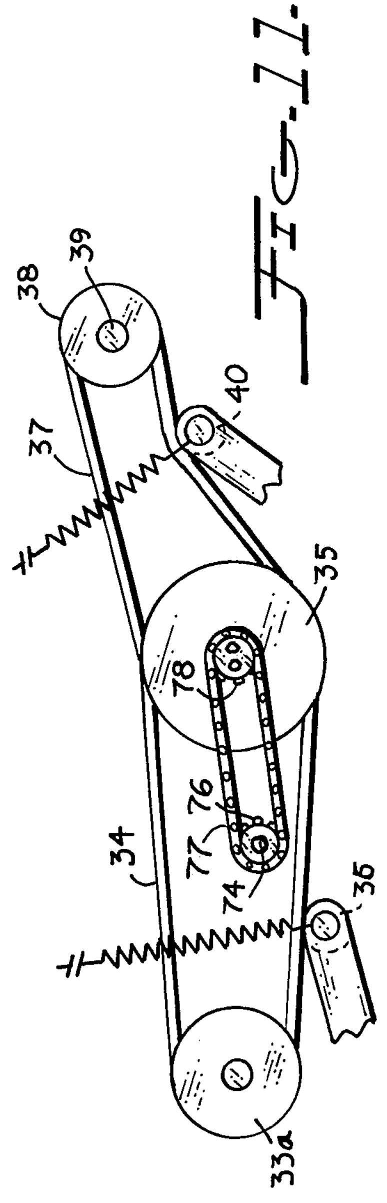
FIG. 11 is a schematic side elevation of some of the driving mechanism shown in FIG. 10.

It is best now to describe the mechanism for operating the beater/feeder E, the fluffer F, and the auger G, in the hopper B, and for operating the metering device H. In FIGS. 10 and 11, I show diagrammatic views of the operating mechanism. A source of power such as a gasoline engine K is shown in FIG. 10 and it may be started operating by a starter generator L. An electric clutch M, is normally in engagement and will rotate a pulley **33*a* as soon as the engine is started. An endless belt 34 connects the pulley 33*a* to a double grooved pulley 35. A spring biased idler pulley 36 maintains the proper tension on the endless belt 34. Another endless belt 37** operatively connects the double-grooved pulley 34 to a pulley 38 which is mounted on a shaft 39. Another spring-biased idler pulley 40 keeps the endless belt 37 at the proper tension. The shaft 39 connects with a right angle drive 41 through an adjustable safety slip clutch 42 which will automatically disconnect the shaft 39 from the right angle drive mechanism 41 should any one of the operating members in the hopper B, or the metering device H become jammed for any reason.

Figure 4:
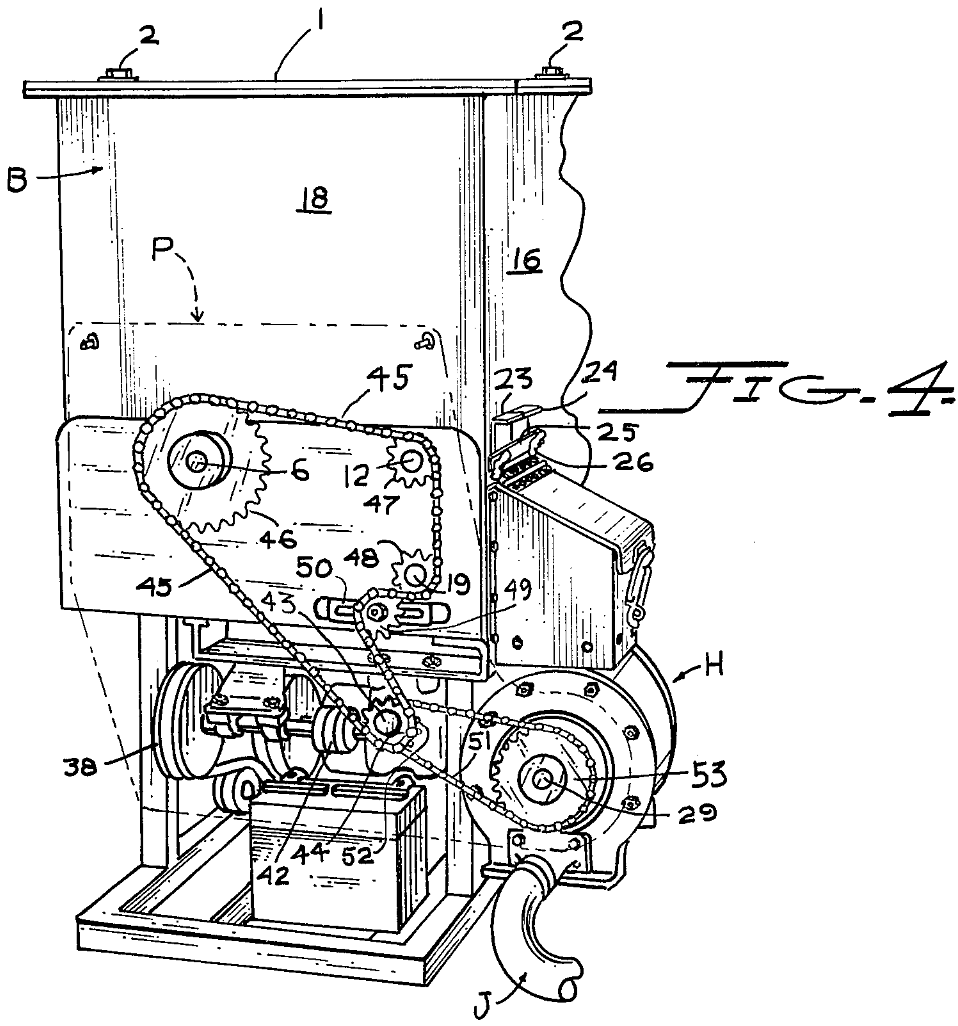
FIG. 4 is an end and partial side view of the hopper when looking at the left hand end of FIG. 1 and with the housing for the driving mechanism removed.

A driven shaft 43 extends from the right angle drive mechanism 41 and the shaft has a pair of sprockets keyed thereto, see FIG. 10. One of the sprockets 44 on the shaft 43 has an endless chain 45, connected thereto, see FIG. 4. The chain 45 is passed around a large sprocket 46 that is keyed to the shaft 6 of the beater/-feeder E, as shown in FIG. 6. The endless chain 45 is then passed around a small diameter sprocket 47 that is keyed to the shaft 12 which rotates the high speed fluffer F, at a much higher speed than the beater/feeder E. Then the endless chain 45 is passed around a third sprocket 48 mounted on the shaft 19 of the auger G, see FIG. 7. A slack take-up sprocket 49 is adjustably mounted along a slotted guide 50, secured to the end wall 18 of the hopper B, as shown in FIG. 4. The endless chain 45 will rotate the sprockets 46, 47 and 48 in a counterclockwise direction when looking at FIG. 4.

The metering device H, is operatively connected to the driven shaft 43, see FIGS. 4 and 10 by an endless chain 51 that extends around the second sprocket 52 on the driven shaft 43 and around a large sprocket 53 on the metering shaft 29. I have already mentioned that when a capacity or compartment 31 filled with the fluffed insulating material C, reaches the position 31a in FIG. 5, the air under pressure flowing through the hose or pipe 33 will enter the compartment 31a and blow the material from the compartment and into the outlet hose J. I will describe hereinafter the three different types of nozzles that may be attached to the hose J.

FIG. 10 shows an air blower N whose shaft 54 has the double grooved pulley 34 keyed thereto. As soon as the engine K, is started operating, the blower N will be operated and will draw air into it through the intake 55 and will force it through an outlet pipe 56, past a check valve 57 and into the pipe 33 which communicates with the compartment 31a of the metering device H. In FIG. 1, I show a closure P for enclosing all of the sprockets and endless chains shown in FIG. 4. A fuel tank Q, is placed along the hopper side wall 16, see FIG. 1, and will feed fuel to the engine K, as required.

Figure 12:
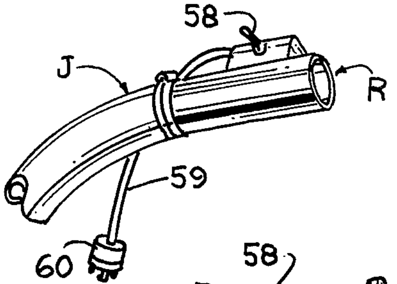
FIG. 12 is a perspective view of one type of nozzle connectible to the outlet hose and used for blowing the dry insulating material into an area such as an attic. The nozzle has a manually controlled switch for closing an electric circuit to actuate an electric clutch for disconnecting the gasoline engine from the operating mechanism.

In FIG. 12, I show one of the nozzles R connected to the outlet hose J. This nozzle is designated as a dry blow nozzle and is used when blowing the insulating material into an attic for insulating it. It will be noted that this nozzle R has a manually controlled cut-off switch 58 so that the operator can disconnect the drive pulley 33a from the engine K by actuating the switch for closing an electric circuit to the electric clutch M for disconnecting the pulley from the engine while still permitting the engine to continue operating. This arrangement obviates the necessity of clearing the hose J of the insulating material C, at the end of each operation. In the diagrammatic showing of FIG. 10, I have indicated a simple electric circuit for actuating the electric clutch M for freeing the pulley 33a from the engine K. An electric cord 59 extends from the switch 58 to a connector 60 which in turn is coupled to a connector 61 that has one wire 62 leading to the electric clutch M, and another wire 63 leading to a source of current 64 and then to ground. A wire 65 leads from the electric clutch M to ground and this completes the circuit to actuate the electric clutch M each time the switch 58 is closed.

Figure 14:
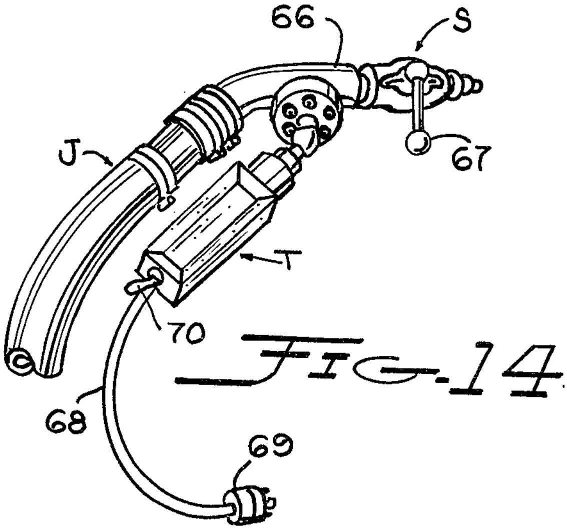
FIG. 14 is a perspective view of another type of nozzle attachable to the outlet hose and having a pressure sensitive switch associated therewith which will close an electric circuit to the electric clutch for disconnecting the gasoline engine from the operating mechanism when the nozzle that directs the insulating material into a cavity, fills the cavity with the material and creates a back pressure in the nozzle sufficient to actuate the switch and stop the mechanism from further operation.

Another type of nozzle S is illustrated in FIG. 14 where it is desired to fill a confined space, such as a wall cavity, with the insulating material and have the electric clutch M automatically disconnect the pulley 33a from the engine K when the cavity is filled with the material. The nozzle S, is connected to a tubular member 66 which in turn is coupled to the hose J. A pressure sensitive switch T, is shown diagrammatically in FIG. 14 and communicates with the tubular member 66 so as soon as the back pressure in the member 66 reaches a predetermined point the pressure sensitive switch will be closed and will cause the electric clutch M to free the pulley 33a from the engine K.

In actual practice the nozzle S, see FIG. 14, is inserted into an opening in a wall, not shown, that leads to a cavity in the hollow wall that is to be filled with the insulating material C, the engine K, is started and the handle 67 is actuated for opening the nozzle S, after the nozzle has been inserted into the opening communicating with the interior of the hollow wall. A cord 68 leading from the pressure sensitive switch T has a connector 69 that can be coupled to the electrical connector 61 shown in FIG. 10. The insulating material C will be forced into the confined wall space until this space is filled and will create a back pressure within the nozzle S, and within the tubular member 66 and will actuate the pressure sensitive switch T for closing the electric circuit to actuate the electric clutch and free the pulley 33a from the engine K. When this occurs, the operator can move the handle 67 to close the nozzle S, and then move the hose J, and nozzle S to the next opening for filling a cavity in the hollow wall, not shown. Again the hose J need not be emptied of its insulating material before moving the nozzle S from one location to another. A second switch 70 is connected in parallel with the pressure sensitive switch T so that the operator can disconnect the engine from the pulley 33a any time he wishes.

Figure 13:
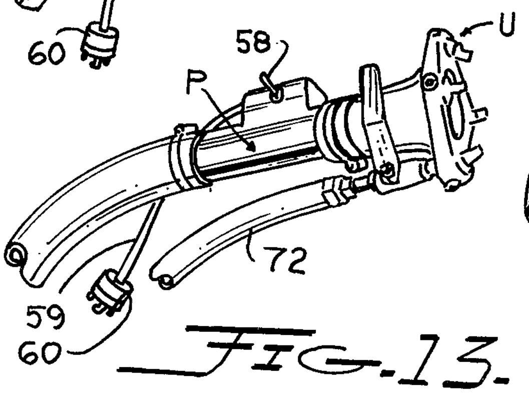
FIG. 13 is a perspective view of the type of nozzle shown in FIG. 12 and to which a wet spray nozzle is attached for mixing a liquid adhesive with the insulating material for causing the material to adhere to a surface against which it is directed by the nozzle.

FIG. 13 shows a liquid applying nozzle U connected to the nozzle R which is also shown in FIG. 12. In certain cases it is desirable to mix a liquid adhesive with the insulating material C so that the material will adhere to a surface. This makes decorative spraying possible for applying the insulating material to walls and ceilings of homes, restaurants, cocktail lounges, etc. The apparatus shown diagrammatically in FIGS. 10 and 11 makes use of a high pressure pump V that has an inlet conduit 71 for conveying the liquid adhesive from a tank, not shown, and has an outlet conduit 72 leading from the pump to the nozzle U. The high pressure pump shaft 73 is connected to a shaft 74 by a coupling 75, as shown in FIG. 10. A sprocket 76 on the shaft 74 can be operatively connected to the shaft 54 by an endless chain 77 and sprocket 78, the latter being keyed to the shaft 54 only when the operator wishes to mix liquid adhesive with the insulating material and then he attaches the liquid applying nozzle U to the nozzle R for mixing the liquid adhesive to the material just prior to the nozzle R applying the material to a surface, the adhesive causing the material to adhere to the surface. In all other respects the liquid applying nozzle U depends on the nozzle R for its operation. Like reference characters have been applied to the nozzle R, shown in FIG. 13, as used for the same nozzle shown in FIG. 12. No further description of the nozzle U need be given. When the liquid applying nozzle U, is not used it is disconnected from the nozzle R, and the sprocket 78 is removed from the shaft 54 and with it the chain 77.

OPERATION

From the foregoing description of the various parts of the device, the operation thereof may be readily understood. FIGS. 1, 2 and 3 show a bale of the insulating material C being fed into the hopper B. The slidable cover 3 is open in FIGS. 1 and 2 and closed in FIG. 3. The grill D initially breaks up the bale into smaller particles as the operator breaks up the bale portion resting on the grill and the grill serves the additional function of acting as a safety device to prevent an operator's hands from moving down into the beating and fluffing apparatus located in the lower portion of the hopper. When the machine is operating, the vibrations of the frame and hopper will cause the grill D to vibrate and aid in breaking up the material.

As already stated that part of the insulating material that drops onto the beater/feeder E, is beaten into smaller particles and fed transversely over the hump lying between the concave bottom wall portion 5*a* and 5*b* and toward the right hand wall 16 of the hopper B, in FIG. 5. Also the portion of the material C that falls upon the fluffer F, is broken up into smaller particles and any material moved by the beater/feeder E, against the fluffer F, is broken into smaller particles and is forced downwardly into the auger G, and the concave portion 5*b*. The fluffer rotates at a much faster speed than the beater/feeder in order to keep the material in a fluffy state as it is fed into the auger G, and concave bottom wall portion 5*b*.

The thoroughly fluffed insulating material C, now drops by gravity onto the auger G. FIG. 7 shows the angle inclined and helically arranged auger blades extending over that portion of the auger shaft 19 up to the exit opening 17 in the hopper wall 16 and these blades will move and fluff the material and cause it to travel in the hopper trough 5*b* toward the exit opening 17. It will be noted that the auger shaft 19 has the longitudinally extending and radially projecting paddles 21 arranged opposite the opening 17. Also the length of the paddles is coextensive with the length of the opening 17. The angled blades 20 move the insulating material in a direction paralleling the axis of the shaft 19 while the paddles 21 change the direction of travel of the material at right angles and propel the material through the opening 17.

The volume of fluffed material fed through the exit opening 17 in the hopper wall 16 is controlled by the two gates 23 and 24 that can be adjusted to reduce the opening size to any degree desired, see FIGS. 5 and 7. The metering device H receives the fluffed insulating material and the revolving compartments 31 successively receive the material in equal amounts and when they reach the position 31*a*, as in FIG. 5, the compressed air from the hose 33 will blow the material from the compartment 31*a* and into the outlet hose J.

It will be seen that the path of the material in the bale C, is first downwardly through the safety grill D where it is initially broken up into smaller particles and then the material drops upon the beater/feeder E, and upon the rotating fluffer F. Both of these members E and F, maintain the material in a fluffy condition and move it toward the right hand wall 16 of the hopper B. It is again to be noted that I provide the undulated bottom hopper wall 5 with the two parallely arranged concave portions 5*a* and 5*b* as shown in FIG. 5, and separated by a convex ridge which extends throughout the length of the hopper.

The cellulose material has a tendency to mat and stick together and will quickly build up a bridging layer of material on the bottom wall of the hopper if no means is provided for keeping all areas of this bottom wall swept clear of material. I accomplish this automatic sweeping of the bottom wall by forming it into two parallel concave portions 5*a* and 5*b*, see FIG. 5, separated by a longitudinally convex portion lying therebetween. The radius of the concave portion 5*a* has the axis of the beater/feeder E, as its center while the radius of the concave portion 5*b* has the axis of the auger G, as its center. The paddles 8 on the beater/feeder E sweep the material away from the concave inner surface 5*a* and move it over the convex hump and toward the concave portion 5*b*. In like manner, the helix paddles 20 on the auger G, move the material along the concave portion 5*b* toward the outlet opening 17 in the hopper wall 16 and prevent the material from matting and building up along the concave surface 5*b*. The result is that the hopper bottom wall 5 is kept clean and the material is fluffed and moved quickly to the auger and out through the hopper wall opening 17 and into the metering device H.

I claim:

1. In a device of the type described:

(a) a hopper for receiving a cellulose material and having vertical spaced apart side walls with an outlet opening in one of the walls and disposed adjacent one end of said hopper;

(b) a beater and cellulose feeder rotatably mounted on a horizontal axis in said hopper and positioned near the hopper side wall not having the outlet opening therein;

(c) an auger rotatably mounted in said hopper on a horizontal axis positioned below the axis of said beater, said auger placed adjacent to the hopper side wall having the outlet opening therein, and the axis of said auger paralleling the axis of said beater;

(d) said hopper having a bottom wall with a longitudinally extending first portion underlying said beater, concave in cross section to form a trough whose axis coincides with said beater axis so that the beater in operation will continually remove cellulose material from the trough and force it toward said auger; said bottom wall also having a longitudinally extending second trough-like portion underlying said auger which is concave in cross section and whose axis coincides with said auger axis, the second trough being at a lower position than said first trough, said bottom wall having a longitudinally extending middle portion convex in cross section and lying between said first and second concave portions;

(e) said beater having paddles and means for rotating said beater for causing the paddles to sweep the interior of said first concave portion of cellulose and to throw the cellulose over the convex middle portion and into said auger;

(f) said auger having spaced apart and radially extending blades whose faces extend at a 45° angle and forming a helical beater which fluffs the cellulose material received from said beater, and means for rotating said auger for causing its blades to sweep the interior of said second trough clean of cellulose and to keep the cellulose fluffy while moving it toward the opening in the hopper side wall, the portion of said auger disposed opposite said outlet opening having longitudinally extending and radially projecting paddles for receiving the fluffed cellulose and for sweeping the interior of said second concave portion clean of cellulose and moving it while still in a fluffed condition through the outlet opening; and (g) a cellulose material fluffer rotatably mounted in said hopper above said auger, the axis of said fluffer lying substantially in the same horizontal plane as the beater axis and parallel therewith for receiving cellulose material laterally thrown by said beater for further fluffing the cellulose material and directing it downwardly onto said auger where the cellulose material is continually fluffed and fed along the auger to the wall opening where the longitudinal paddles will propel the fluffed cellulose through the wall opening; and (h) a safety grill mounted in said hopper above said beater and fluffer and lying in a substantially horizontal plane for preventing an operator's hands from contacting any of the rotating parts, said grill also being used in initially breaking up a bale of cellulose material as it is forced downwardly through said grill by an operator.

2. The combination as set forth in claim 1; and in which (a) a metering device for receiving the fluffed cellulose material from the outlet opening;

(b) means for forcing air into the metering device for forcing cellulose material therefrom; and (c) means for coating the particles of cellulose material with a liquid adhesive.

* * * * *